United States Patent Office

3,150,106
Patented Sept. 22, 1964

3,150,106
PROCESS FOR MANUFACTURING ZINC AND CADMIUM ACETATE-ACTIVATED CARBON CATALYSTS
Gerhard Hübner, Burghausen, Upper Bavaria, Germany, assignor to Wacker-Chemie G.m.b.H., Munich, Germany, a corporation of Germany
No Drawing. Filed Sept. 6, 1960, Ser. No. 53,905
Claims priority, application Germany Nov. 4, 1959
2 Claims. (Cl. 252—428)

This invention relates to the manufacture of catalysts for use in producing monomeric vinyl esters in the gas phase, and it has for its object to provide a novel and improved process for this purpose.

Another object of the invention is to manufacture catalysts of the above type, comprising activated carbon impregnated with zinc acetate or cadmium acetate, which are distinguished by their extraordinarily uniform charges, their marked grain stability and their high catalytic activity.

Still another object is to produce catalysts of the above type economically by minimizing and simplifying the apparatus required for their production, by effecting substantial savings in fuel consumption and labor costs, and by increasing the yield of the product by eliminating waste.

Various other objects and advantages will be apparent as the nature of the invention is more fully disclosed.

In producing monomeric vinyl esters by converting organic acids with acetylene, it is preferred to use catalysts consisting of activated carbon and zinc acetate or cadmium acetate. It is know that the activity of such catalysts is greatest when the zinc content, for example, amounts to about 11%, and consequently there is a mixture of 30–31 parts of $Zn(CH_3COO)_2$ and 69–70 parts of activated carbon. However, since 70 grams of activated carbon can absorb only about 70 ccm. of zinc acetate solution, and 70 ccm. of an aqueous solution saturated at 20° C. contain only about 20 g. of $Zn(CH_3COO)_2$, impregnation is done by either pouring or spraying on highly concentrated hot solutions while at the same time the mass is mixed, turned over by shovel, or stirred. However, the impregnation can also be made with unsaturated hot solutions, where the excess water is evaporated during vigorous stirring.

At any rate elevated temperatures and additional mixing steps are required, which result in a loss of firmness of the catalyst grain and in the formation of dust or broken-off particles. Also subsequent sieving is required, and the resulting waste material is worthless. Furthermore, all pipe lines containing the hot saturated solution, and also the valves and gauges employed, must be heated and insulated. If impregnation is done by spraying, then the activated carbon also must be pre-heated, because otherwise the zinc acetate crystallizes on the cold surface of the carbon. It should also be noted as a disadvantage that the homogeneity or impregnation in all previous methods mentioned here leaves something to be desired, and that all the process steps are intricate.

I have now discovered a process for manufacturing zinc or cadmium acetate-activated carbon catalysts for use in producing monomeric vinyl esters, in which an excess of catalyst solution is used. The process is characterized by the fact that stationary activated carbon such as charcoal is treated at room temperature with a zinc or cadmium acetate solution, while continuously checking the reduction of concentration of the impregnating solution, and excess catalyst solution is separated from impregnated catalyst before the conclusion of the adsorption process.

Complete adsorption, if any, takes place subsequently during deposit of the still wet catalyst from the impregnating soltuion absorbed by the pores of the carbon.

Exhaustive tests have demonstrated that an average of 2 hours are required for the complete saturation of the adsorption-active centers of the activated carbon with zinc or cadmium acetate, i.e., until the adsorption balance is reached at room temperature. At higher temperatures the balance is reached sooner, but difficulties arise due to the fact that the reduction of concentration of the solution, caused by the adsorption, is eliminated in part or entirely by evaporation or vaporization of the water. Thus the desired charging or loading levels are not attained. On the other hand, the evaporation losses depend on various factors, for instance the kind of apparatus employed, insulation and temperature level, hence these losses cannot be calculated exactly. Also, only a small part of the heat energy introduced is utilized for the subsequent drying of the catalyst.

The process of the present invention is preferably carried out in a device which consists essentially of a sieve basket which can be closed, a container or tank for the acetate solution and an analyzing instrument, for instance a hydrometer. The impregnating solution is pumped into circulation, passing through the activated carbon sitting in the sieve basket, and part of the circulating solution passes through the analyzing device. But the impregnating solution can be kept in motion by other methods too, for instance by a rotor installed in the bottom of the impregnating container or by a stirrer installed on the edge of the container.

The impregnating solution (zinc or cadmium acetate solution) can be prepared in the impregnating container itself, or else in a separate, perhaps portable, "saturator." It is advantageous to use a hydrometer for checking the concentration.

The simplest way to interrupt the impregnating process is to lift out the sieve basket from the excess catalyst solution in the container when a desired concentration has been reached. The final concentration can be computed by the formula:

$$k' = \frac{ck - ba}{c - be}$$

where, $a =$ g. of Zn or Cd kg. of activated carbon (desired charge or load)
$b =$ quantity of activated carbon per charge (kg.)
$c =$ quantity of impregnating solution (liters)
$e =$ absorptivity of the activated carbon (liter/kg.)
$k =$ initial concentration (g. Zn or Cd/liters of solution)
$k' =$ final concentration (g. Zn or Cd/liters of solution)

This method makes possible an impregnation which is uniform from charge to charge, because variations in the adsorption capacity of the activated carbon express themselves no longer in the amount of the charge, but only in the time period required.

*Example*

In an apparatus consisting of a saturator, impregnating vessel, sieve basket, pump and continuously indicating hydrometer, first a zinc acetate solution is made with 100 g. Zn per liter by stirring or circulating water at room temperature through the saturator filled with solid zinc acetate. 700 liters of this solution are then pumped through the impregnating vessel which contains the sieve basket filled with 200 kg. of activated carbon, with the sieve lid closed.

Starting with the stipulation that the dried catalyst must contain 11% of Zn, the concentration at which the impregnation must be stopped is computed as follows:

$a = 159$ g./kg.

$b = 200$ kg.

$c = 700$ liters $e = 1$ liter/kg.

$k = 100$ g./liter $$k' = \frac{700 \cdot 100 - 159 \cdot 200}{700 - 200 \cdot 1}$$

$$= \frac{38,200}{500} = 76.4 \text{ g./liter}$$

Thus as soon as the concentration has fallen to 76.4 g. liter the sieve basket is raised and lifted out, and the still moist catalyst is best loaded directly into a reaction furnace by way of a sieve slide where the excess solution, if any, can drip off, and there it is dried in the customary manner.

The process is also performed in exactly the manner described above, using a cadmium acetate solution instead of a zinc acetate solution.

The catalysts produced in accordance with the invention are distinguished by extraordinarily uniform charges, great grain stability and high activity. Further advantages of the process are: the simplified apparatus, since the heating of conduits, fittings and gauges is eliminated; the reduced tendency to develop trouble, because slogging of valves and pipelines by crystallizzation is impossible; and the saving of heat energy and cost of labor. Also, the weighing scales, which usually are required, are not necessary and weighing errors are thus eliminated.

Since there are no pieces broken off, the catalyst yield is larger; and sifting of the finished catalyst is no longer necessary.

For converting the catalyst the impregnating apparatus is set up at the reaction furnace employed in the process, and the still moist catalyst is loaded in directly. For this purpose the sieve basket also serves as a transportation container. Thus the movement or jarring of the activated carbon grains is reduced to the smallest possible extent.

In accordance with the described process it is possible to produce catalysts containing up to 13–14% of zinc or 30% of cadmium, if suitable adsorbing activated carbons are used.

The invention claimed is:

1. Process for producing a catalyst consisting of activated carbon impregnated with a substance selected from the group consisting of zinc acetate and cadmium acetate, for use in the catalytic production of monomeric vinyl esters in the gas phase, which comprises placing said activated carbon in a position of rest in a solution of said substance exceeding in volume the quantity required to impregnate said activated carbon, keeping track of the reduction of concentration of said solution during the impregnation of said activated carbon, removing the impregnated activated carbon from the excess solution before the conclusion of the adsorption process, and drying said impregnated activated carbon, said process being characterized by the fact that the impregnated activated carbon is removed from the excess impregnating solution as soon as said solution has reached the concentration $$k' = \frac{ck - ba}{c - be}$$

where "$a$" is g. of a member selected from the group consisting of Zn/kg. and Cd/kg. of activated carbon, "$b$" is the quantity of activated carbon per charge in kg., "$c$" is the quantity of impregnating solution in liters, "$e$" is the absorptivity of the activated carbon in liters/kg. "$k$" is the initial concentration in g. of a member selected from the group consisting of Zn and Cd/liters of solution, and "$k'$" is the final concentration in g. of a member selected from the group consisting of Zn and Cd/liters of solution.

2. Process according to claim 1, in which the impregnating of said activated carbon by said solution is carried out at room temperature.

References Cited in the file of this patent

UNITED STATES PATENTS

| | | |
|---|---|---|
| 2,121,342 | Dreyfus | June 21, 1938 |
| 2,485,044 | Gehrke | Oct. 18, 1949 |
| 2,525,526 | Coover et al. | Oct. 10, 1950 |